ELECTRIC SWITCHING MEANS FOR CONTROLLING HIGHLY INDUCTIVE CIRCUITS
Filed April 10, 1964
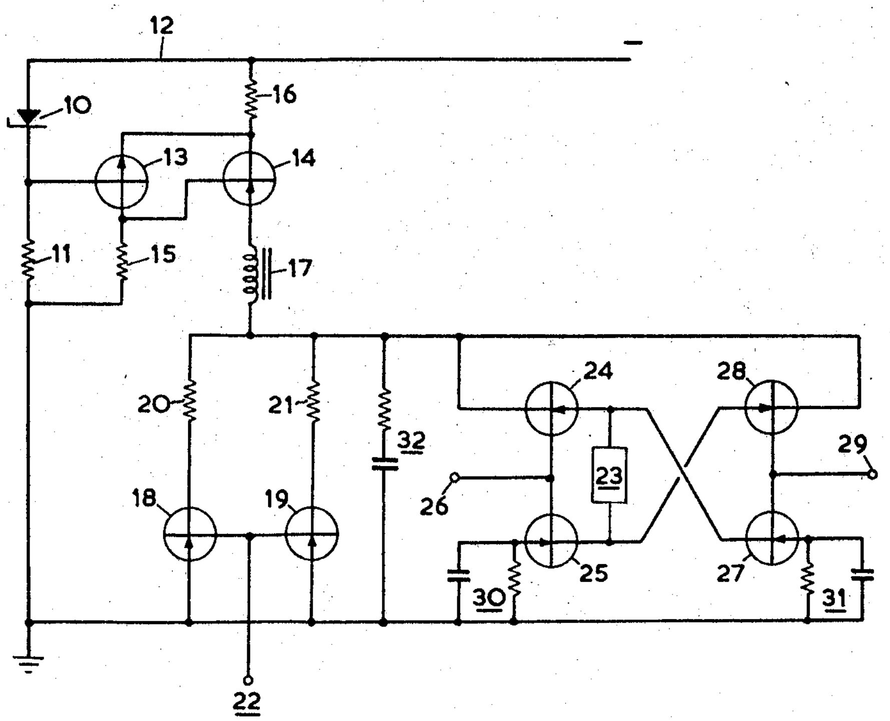

United States Patent Office

3,388,300

Patented June 11, 1968

3,388,300

ELECTRIC SWITCHING MEANS FOR CONTROLLING HIGHLY INDUCTIVE CIRCUITS

Reginald Hugh Allmark, Stoke-on-Trent, England, and Wilfred James Jones, Edinburgh, Scotland, assignors to The English Electric Company Limited, London, England, a British company Filed Apr. 10, 1964, Ser. No. 359,558
Claims priority, application Great Britain, Apr. 11, 1963, 14,521/63
3 Claims. (Cl. 317—148.5)

This invention relates to electric switching means for controlling highly inductive circuits.

According to the present invention an electric switching means comprises two transistors of the same conductivity type, referred to hereinafter as the control and switching transistors respectively, a series electrical circuit for connection with a source of constant unidirectional potential and including in series connection a linear resistor, the collector-emtter path of the control transistor, a linear inductor, and the collector-emitter path of the switching transistor, means connecting a highly inductive load circuit in parallel with the switching transistor, closed-loop control means having an input connection connected with the collector of the control transistor and an output connection connected with the base of the control transistor for varying the base-emitter potential of the control transistor in dependence upon its collector potential in a manner tending to maintain the collector electrode of the control transistor at a constant potential corresponding to that developed when the current flow in the control transistor is equal to the desired load circuit current, and input circuit means connected with the base electrode of the switching transistor for applying thereto a two-state input potential signal whereby according to the state of the input potential signal the switching transistor is rendered either nonconductive or fully conductive.

According to a preferred feature of the present invention the closed-loop control means includes an auxiliary control transistor of conductivity type opposite to that of the other transistors, the said input connection being connected with the emitter electrode of the auxiliary control transistor and the said output connection being connected with the collector electrode of the auxiliary control transistor, a source of constant reference potential connected with the base electrode of the auxiliary control transistor, and a linear resistor connecting the collector electrode of the auxiliary control transistor to a source of constant potential whereby to enable the auxiliary control transistor to modify the flow of current in the said linear resistor of the said series electrical circuit in dependence upon the difference of the reference potential and the collector potential of the control transistor and in a sense tending to reduce the said difference.

According to another preferred feature of the present invention the source of constant reference potential comprises a Zener diode, means connecting the Zener diode on one side to the base electrode of the auxiliary control transistor, and on the other side to the said linear resistor of the said series electrical circuit at the end remote from the collector of the control transistor, a linear resistor connecting the Zener diode with a source of constant unidirectional potential whereby to cause the Zener diode to operate at the Zener voltage, and an output connection connected with the junction of the Zener diode and the said linear resistor associated with the Zener diode.

One electric swtiching means according to the present invention for switching current pulses into a drive circuit for a row of ferromagnetic cores of a magnetic core store associated with a data processing apparatus will now be described by way of example and with reference to the accompanying drawing.

Referring to the drawing, a Zener diode 10 is connected in series with a resistor 11 between a negative bus-bar and earth. The base of an n-p-n auxiliary control transistor 13 is connected to the junction of the diode 10 and the resistor 11. The collector of the transistor 13 is connected to the base of a p-n-p control transistor 14 and through a resistor 15 to earth. The emitter of the transistor 13 is connected to the collector of the transistor 14 and through a resistor 16 to the negative bus-bar 12. The emitter of the transistor 14 is connected through an inductance 17 to earth through a first switching circuit which consists of two switching transistors 18 and 19 electrically in parallel, each with a low value resistor 20, 21 connected in its collector circuit: the bases of the transistors 18 and 19 are connected to an input terminal 22.

A highly inductive load circuit 23 is connected in a second switching circuit arranged in parallel with the first switching circuit. The load circuit 23 comprises a circuit passing through a row of magnetic cores in a magnetic core store of a data processing apparatus, the arrangement being such that the current through the circuit, if of sufficient magnitude, affects the state of magnetisation of the magnetic cores. The cores are, as is well known, capable of being switched from one stable state of magnetisation to another and vice versa so as to represent "1" or "0" bits of data. The state to which the cores are switched is determined by the direction of current through the circuit. If data stored in the cores is to be read out from the store, the current must pass through the cores in one direction: if data is to be written into this store, the current must pass in the opposite direction through the cores. The cores make the load circuit 23 highly inductive.

The second switching circuit in which the load circuit 23 is connected comprises two circuit paths. The first path comprises a pair of transistors 24 and 25, having their bases connected to a common input terminal 26, which are positioned one on either side of the load 23. The second path comprises a pair of transistors 27 and 28, having their bases connected to a common input terminal 29, which are likewise positioned one on either side of the load circuit 23. Each circuit path includes a parallel resistance-capacitance circuit 30, 31.

A series resistance-capacitance circuit 32 is connected in parallel with the two switching circuits.

The operation of the circuit will now be described. The transistors 13 and 14 together act to produce a constant current output to the switching circuits. The resistor 16 and the Zener diode 10 are selected so that normally the voltage drops across them are the same. Any divergence between the voltage drops due to change in current through resistor 16 causes the base-emitter potential of transistor 13 to alter. The current through transistor 13 alters, therefore, changing the potential of the base of transistor 14. The current through transistor 14, and hence the current through the resistor 16 then alters in a sense such as to equalize the voltage drops across the resistor 16 and the Zener diode 10. The arrangement therefore produces a constant voltage drop across the resistor 16 (and hence a constant collector potential of transistor 14), and the current through this resistor is the constant current output which flows through the inductor 17 to the switching circuit.

Normally, transistors 18 and 19 are fully conducting and transistors 24 to 28 are nonconducting. The constant current therefore flows only through transistors 18 and 19 and not through the load circuit 23. To pass a pulse through the load circuit 23, firstly a negative potential is applied to either terminal 26 or 29, but not both, so that either transistors 24 and 25 or transistors 27 and 28 are both saturated. The resistance of the resistors in the resistance-capacitance networks 30 and 31 is ten to twenty times the resistance of the resistors 20 and 21 so that very little of the constant current flows through the load circuit 23, the majority of the current still passing through the transistors 18 and 19. Then a positive pulse is applied to terminal 22 and the transistors 18 and 19 are cut off for the duration of the pulse. The constant current is therefore diverted through the load circuit 23. When the pulse supplied to terminal 22 is terminated, the transistors 18 and 19 recommence conducting fully so that the constant current again flows only through transistors 18 and 19 and therefore the current in the load circuit 23 decays to zero. Any back E.M.F. in the load circuit caused by the decaying of the current in the high inductance of the load circuit is opposed by the discharge of the capacitor in the appropriate one of the resistance-capacitance networks 30 and 31. The inductor 17 opposes any changes in the current magnitude when the constant current starts to flow in the load circuit.

The direction of the current in the load circuit 23 is determined by the choice of which of the pair of transistors 24, 25 and 27, 28 is rendered conducting, this in turn being determined by the choice of which of the terminals 26 and 29 receives the negative potential.

What we claim as our invention and desire to secure by Letters Patent is:

1. An electrical switching means comprising two transistors of the same conductivity type, referred to hereinafter as the control and switching transistors respectively, a series electrical circuit for connection with a source of constant unidirectional potential and including in series connection a linear resistor, the collector-emitter path of the control transistor, a linear inductor, and the collector-emitter path of the switching transistor, means connecting a magnetic core store drive circuit in parallel with the switching transistor, closed-loop control means having an input connection connected with the collector of the control transistor and an output connection connected with the base of the control transistor for varying the base-emitter potential of the control transistor in dependence upon its collector potential in a manner tending to maintain the collector electrode of the control transistor at a constant potential corresponding to that developed when the current flow in the control transistor is equal to the desired drive circuit current, and input circuit means connected with the base electrode of the switching transistor for applying thereto a two-state input potential signal whereby according to the state of the input potential signal the switching transistor is rendered either non-conductive or fully conductive.

2. An electrical switching means according to claim 1, wherein the closed-loop control means includes an auxiliary control transistor of conductivity type opposite to that of the other transistors, the said input connection being connected with the emitter electrode of the auxiliary control transistor and the said output connection being connected with the collector electrode of the auxiliary control transistor, a source of constant reference potential connected with the base electrode of the auxiliary control transistor, and a linear resistor connecting the collector electrode of the auxiliary control transistor to a source of constant potential whereby to enable the auxiliary control transistor to modify the flow of current in the said linear resistor of the said series electrical circuit in dependence upon the difference of the reference potential and the collector potential of the control transistor and in a sense tending to reduce the said difference.

3. An electrical switching means according to claim 2, wherein the source of constant reference potential comprises a Zener diode, means connecting the Zener diode on one side to the base electrode of the auxiliary control transistor, and on the other side to the said linear resistor of the said series electrical circuit at the end remote from the collector of the control transistor, a linear resistor connecting the Zener diode with a source of constant unidirectional potential whereby to cause the Zener diode to operate at the Zener voltage, and an output connection connected with the junction of the Zener diode and the said linear resistor associated with the Zener diode.

References Cited

UNITED STATES PATENTS

| | | | |
|---|---|---|---|
| 2,888,632 | 5/1959 | Livezey | 323—4 |
| 2,897,411 | 7/1959 | Brown | 317—123 |
| 3,065,358 | 11/1962 | Lee | 307—88 |
| 3,213,433 | 10/1965 | Tribby | 340—174 |
| 3,231,753 | 1/1966 | Brown | 307—88.5 |

MAYNARD R. WILBUR, *Primary Examiner.*

DARYL W. COOK, *Examiner.*

J. H. WALLACE, G. R. EDWARDS,
*Assistant Examiners.*